(12) United States Patent
Patadia (10) Patent No.: US 7,783,670 B2
(45) Date of Patent: Aug. 24, 2010

(54) CLIENT SERVER CONVERSION FOR REPRESENTING HIERARCHICAL DATA STRUCTURES

(75) Inventor: Jalpesh Patadia, Boulder, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 149 days.

(21) Appl. No.: 11/340,392

(22) Filed: Jan. 26, 2006

(65) Prior Publication Data

US 2006/0123026 A1    Jun. 8, 2006

Related U.S. Application Data

(63) Continuation of application No. 10/992,152, filed on Nov. 18, 2004, now abandoned.

(51) Int. Cl.
*G06F 7/00* (2006.01)
*G06F 17/30* (2006.01)

(52) U.S. Cl. ............ 707/797; 707/829; 707/999.1; 707/999.102; 709/213; 715/255

(58) Field of Classification Search .......... 707/100, 707/102, 797, 829, 999.1, 999.102; 709/213; 715/255
See application file for complete search history.

(56) References Cited

U.S. PATENT DOCUMENTS

| | | | | |
|---|---|---|---|---|
| 5,101,494 | A | * | 3/1992 | Bilski et al. ............. 717/127 |
| 5,335,345 | A | | 8/1994 | Frieder et al. |
| 5,797,128 | A | | 8/1998 | Birnbaum |
| 5,872,928 | A | | 2/1999 | Lewis et al. |
| 5,941,947 | A | | 8/1999 | Brown et al. |
| 6,029,196 | A | * | 2/2000 | Lenz ....................... 709/221 |
| 6,055,637 | A | | 4/2000 | Hudson et al. |
| 6,073,242 | A | | 6/2000 | Hardy et al. |
| 6,088,679 | A | | 7/2000 | Barkley |
| 6,202,066 | B1 | | 3/2001 | Barkley et al. |
| 6,243,747 | B1 | | 6/2001 | Lewis et al. |
| 6,256,741 | B1 | | 7/2001 | Stubblebine |
| 6,285,366 | B1 | | 9/2001 | Ng et al. |
| 6,304,881 | B1 | | 10/2001 | Halim et al. |
| 6,321,336 | B1 | | 11/2001 | Applegate et al. |
| 6,327,594 | B1 | | 12/2001 | Van Huben et al. |

(Continued)

OTHER PUBLICATIONS

"USDataCenters . . . eBusiness," Business Wire, p. 2079, Apr. 4, 2001, pp. 1-2.

(Continued)

*Primary Examiner*—John E Breene
*Assistant Examiner*—Phong Nguyen
(74) *Attorney, Agent, or Firm*—Fliesler Meyer LLP (57) ABSTRACT

Systems and methods for the creation of trees for representing hierarchical data structures are provided. Trees are created on a server, with the tree having nodes that are associated with paths on a server. Each node is associated with a resource locator indicating data that can be accessed through the tree. A tree manager module generates a state of a tree that is then rendered on a client browser for access by a user. Embodiments of the present invention generate a rendering module that is transmitted to a client for use. The rendering module receives tree information from the server, from which it generates javascript that renders the tree on a client web browser. The present invention is advantageous as it allows customizable client-based rendering of tree structures while utilizing well-known mechanisms for creating trees.

17 Claims, 5 Drawing Sheets

U.S. PATENT DOCUMENTS

| | | |
|---|---|---|
| 6,327,628 B1 | 12/2001 | Anuff et al. |
| 6,360,363 B1 | 3/2002 | Moser et al. |
| 6,397,222 B1 | 5/2002 | Zellweger |
| 6,460,141 B1 | 10/2002 | Olden |
| 6,477,543 B1 | 11/2002 | Huang et al. |
| 6,484,261 B1 | 11/2002 | Wiegel |
| 6,535,869 B1* | 3/2003 | Housel, III .................. 707/691 |
| 6,542,993 B1 | 4/2003 | Erfani |
| 6,574,736 B1 | 6/2003 | Andrews |
| 6,581,054 B1 | 6/2003 | Bogrett |
| 6,611,837 B2* | 8/2003 | Schreiber ................. 707/999.1 |
| 6,671,689 B2 | 12/2003 | Papierniak |
| 6,697,805 B1 | 2/2004 | Choquier et al. |
| 6,715,077 B1 | 3/2004 | Vasudevan et al. |
| 6,738,789 B2 | 5/2004 | Multer et al. |
| 6,751,655 B1 | 6/2004 | Deutsch et al. |
| 6,757,822 B1 | 6/2004 | Feiertag |
| 6,769,095 B1 | 7/2004 | Brassard et al. |
| 6,772,332 B1 | 8/2004 | Boebert et al. |
| 6,792,537 B1 | 9/2004 | Liu et al. |
| 6,832,313 B1 | 12/2004 | Parker |
| 6,854,035 B2 | 2/2005 | Dunham et al. |
| 6,857,012 B2 | 2/2005 | Sim et al. |
| 6,873,988 B2 | 3/2005 | Herrmann et al. |
| 6,931,549 B1 | 8/2005 | Ananda |
| 6,934,934 B1 | 8/2005 | Osborne, II et al. |
| 6,970,445 B2 | 11/2005 | O'Neill et al. |
| 6,978,379 B1 | 12/2005 | Goh et al. |
| 7,003,578 B2 | 2/2006 | Kanada et al. |
| 7,043,685 B2 | 5/2006 | Azuma |
| 7,047,522 B1 | 5/2006 | Dixon, III et al. |
| 7,093,261 B1 | 8/2006 | Harper et al. |
| 7,093,283 B1 | 8/2006 | Chen et al. |
| 7,124,413 B1 | 10/2006 | Klemm et al. |
| 7,181,684 B2* | 2/2007 | Chittu et al. ................. 715/255 |
| 7,185,192 B1 | 2/2007 | Kahn |
| 7,219,140 B2 | 5/2007 | Marl et al. |
| 7,269,664 B2 | 9/2007 | Hutsch et al. |
| 7,272,625 B1 | 9/2007 | Hannel et al. |
| 2001/0034771 A1 | 10/2001 | Hutsch et al. |
| 2001/0039586 A1 | 11/2001 | Primak et al. |
| 2001/0047485 A1 | 11/2001 | Brown et al. |
| 2002/0107892 A1* | 8/2002 | Chittu et al. ................. 707/514 |
| 2002/0107920 A1 | 8/2002 | Hotti |
| 2002/0135617 A1 | 9/2002 | Samid |
| 2002/0152122 A1 | 10/2002 | Chino et al. |
| 2002/0169893 A1 | 11/2002 | Chen et al. |
| 2002/0169975 A1 | 11/2002 | Good |
| 2002/0178119 A1 | 11/2002 | Griffin et al. |
| 2002/0188605 A1* | 12/2002 | Adya et al. ..................... 707/4 |
| 2002/0188869 A1 | 12/2002 | Patrick |
| 2003/0004982 A1 | 1/2003 | Brandon et al. |
| 2003/0046576 A1 | 3/2003 | High et al. |
| 2003/0056026 A1 | 3/2003 | Anuff et al. |
| 2003/0069766 A1 | 4/2003 | Hoffman et al. |
| 2003/0069874 A1 | 4/2003 | Hertzog et al. |
| 2003/0078959 A1 | 4/2003 | Yeung et al. |
| 2003/0110448 A1 | 6/2003 | Haut et al. |
| 2003/0115484 A1 | 6/2003 | Moriconi et al. |
| 2003/0126236 A1 | 7/2003 | Marl et al. |
| 2003/0126464 A1 | 7/2003 | McDaniel et al. |
| 2003/0145275 A1 | 7/2003 | Qian et al. |
| 2003/0146937 A1 | 8/2003 | Lee |
| 2003/0167455 A1 | 9/2003 | Iborra et al. |
| 2003/0182577 A1 | 9/2003 | Mocek |
| 2003/0200350 A1 | 10/2003 | Kumar et al. |
| 2003/0229501 A1 | 12/2003 | Copeland et al. |
| 2004/0010719 A1 | 1/2004 | Daenen |
| 2004/0024812 A1 | 2/2004 | Park et al. |
| 2004/0098606 A1 | 5/2004 | Tan et al. |
| 2004/0107360 A1 | 6/2004 | Herrmann et al. |
| 2004/0162905 A1 | 8/2004 | Griffin et al. |
| 2004/0189716 A1 | 9/2004 | Paoli et al. |
| 2004/0205659 A1 | 10/2004 | Barry et al. |
| 2004/0215650 A1 | 10/2004 | Shaji et al. |
| 2004/0236760 A1 | 11/2004 | Arkeketa et al. |
| 2005/0021656 A1* | 1/2005 | Callegari ..................... 709/213 |
| 2005/0188295 A1 | 8/2005 | Konkus et al. |
| 2005/0246630 A1 | 11/2005 | Deen et al. |
| 2005/0256894 A1* | 11/2005 | Talanis et al. ................ 707/102 |
| 2005/0256899 A1* | 11/2005 | Patadia ........................ 707/102 |
| 2005/0257267 A1 | 11/2005 | Williams et al. |
| 2006/0005150 A1 | 1/2006 | Pankovcin |
| 2006/0167858 A1 | 7/2006 | Dennis et al. |

OTHER PUBLICATIONS

Hayton, R.J. et al., "Access Control in an Open Distributed Environment," 1998 Proceedings of the IEEE Symposium on Security & Privacy, May 3-6, 1998, Oakland, California, USA, 12 pages.

Bertino, Elisa et al., "TRBAC: A Temporal Role-Based Access Control Model," ACM Transactions on Information and System Security (TISSEC), vol. 4, Issue 3 (Aug. 2001), pp. 191-223.

Sandhu, Ravi S. et al., "Role-Based Access Control Models," IEEE Computer, vol. 29, No. 2, Feb. 1996, pp. 38-47.

Covington, Michael J. et al., "Securing Context-Aware Applications Using Environment Roles," ACM Workshop on Role Based Access Control, Proceedings of the Sixth ACM Symposium on Access Control Models and Technologies, SACMAT '01, May 3-4, 2001, Chantilly, Virginia, USA, pp. 10-20.

Yao, Walt et al., "A Model of OASIS Role-Based Access Control and Its Support for Active Security," ACM Workshop on Role Based Access Control, Proceedings of the Sixth ACM Symposium on Access Control Models and Technologies, SACMAT '01, May 3-4, 2001, Chantilly, Virginia, USA, pp. 171-181.

Georgiadis, Christos K. et al., "Flexible Team-Based Access Control Using Contexts," ACM Workshop on Role Based Access Control, Proceedings of the Sixth ACM Symposium on Access Control Models and Technologies, SACMAT '01, May 3-4, 2001, Chantilly, Virginia, USA, pp. 21-27.

Tzelepi, Sofia K. et al., "A Flexible Content and Context-Based Access Control Model for Multimedia Medical Image Database Systems," International Multimedia Conference, Proceedings of the 2001 ACM Workshop on Multimedia and Security: New Challenges, Oct. 5, 2001, pp. 52-55.

Goh, Chen et al., "Towards a More Complete Model of Role," Symposium on Access Control Models and Technologies, Proceedings of the Third ACM Workshop on Role-Based Access Control, 1998, Fairfax, Virginia, USA, pp. 55-61.

http://portal.acm.org/citation.cfm?id=1011436, p. 1, last visited: Oct. 24, 2007.

Koved et al., "Security Challenges for Enterprise Java in an e-Business Environment," pp. 130-152, IBM Systems Journal, vol. 40, No. 1, Jan. 2001.

Microsoft Windows ("Windows Explorer") copyright 1981-2001, 3 pages.

Cohen, LDAP 101: Glue Your Network's Pieces Together, Aug. 12, 2002, Enterprising Networking Planet, http://www.enterprisenetworkingplanet.com/netsp/article.php/1444871, 8 pages.

Wutka, M., Special Edition Using Java Server Pages and Servlets, Oct. 20, 2000, Que, Special Edition, Chapter 17 Browser-Server Interaction, Sending Data to a Hidden Frame, pp. 1-6.

* cited by examiner

CLIENT SERVER CONVERSION FOR REPRESENTING HIERARCHICAL DATA STRUCTURES

CLAIM TO PRIORITY

This application is a Continuation of U.S. patent application Ser. No. 10/992,152 entitled, SYSTEM AND METHOD FOR REPRESENTING HIERARCHICAL DATA STRUCTURES, by Jalpesh Patadia, filed Nov. 18, 2004.

CROSS-REFERENCE TO RELATED APPLICATION

The present application is related to a U.S. Provisional Patent Application No. 60/571,068 entitled SYSTEM AND METHODS FOR AN IMPROVED INTERFACE FOR PORTAL AND WEBSERVER ADMINISTRATION, by Christopher E. Bales, filed on May 14, 2004, the contents of which applications are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to systems, methods and computer readable media for serving data content Java servers. The present invention relates more particularly to rendering hierarchical data structures through a Java server.

BACKGROUND OF THE INVENTION

Since its inception in 1995, the Java programming language has become increasingly popular. Java, which is an interpreted language, enabled the creation of applications which could be run on a wide variety of platforms. This ability to function across a variety of different client platforms and Java's relatively easy implementation of network applications has resulted in its use in endeavors as basic as personal web pages to endeavors as complex as large business-to-business enterprise systems.

Most Java interactions are based around a server product which provides application support and controls access to resources. One such server product is WebLogic Server by BEA Systems of San Jose, Calif.

It is often useful for servers to represent hierarchical data structures such as portals, file systems, and databases through a web interface generated by the server. However, doing so in a manner that is efficient and intuitive has proven difficult. Most solutions have been very narrow in their applications and have faced performance limitations. What is needed is a flexible, intuitive, and powerful mechanism for representing hierarchical data structures generated by a server on a client.

BRIEF SUMMARY

Systems and methods for the creation of trees for representing hierarchical data structures are provided. Trees are created on a server, with the tree having nodes that are associated with paths on a server. Each node is associated with a resource locator indicating data that can be accessed through the tree. A tree manager module generates a state of a tree that is then rendered on a client browser for access by a user. Embodiments of the present invention generate a rendering module that is transmitted to a client for use. The rendering module receives tree information from the server, from which it generates javascript that renders the tree on a client web browser. The present invention is advantageous as it allows customizable client-based rendering of tree structures while utilizing well-known mechanisms for creating trees.

DETAILED DESCRIPTION

The present invention relates to the creation of trees for representing hierarchical data structures. Trees are created on a server, with the tree having nodes that are associated with paths on a server. Each node is associated with a resource locator indicating data that can be accessed through the tree. A tree manager module generates a state of a tree that is then rendered on a client browser for access by a user.

Embodiments of the present invention generate a rendering module that is transmitted to a client for use. The rendering module receives tree information from the server, from which it generates javascript that renders the tree on a client web browser. The present invention is advantageous as it allows customizable client-based rendering of tree structures while utilizing well-known mechanisms for creating trees.

Figure 1:
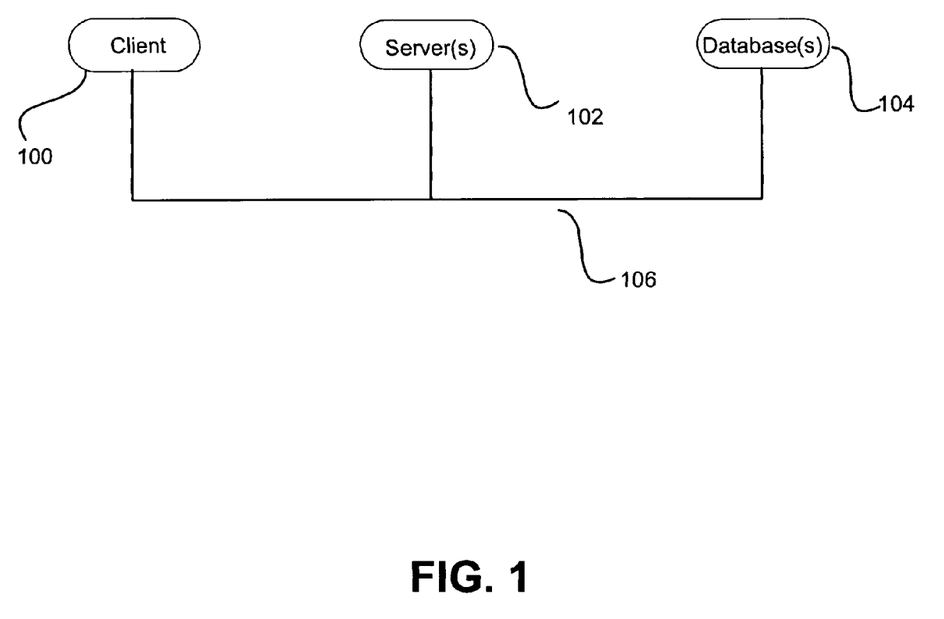
FIG. 1 is a block diagram illustrating an overview of a system for accessing a hierarchical data structure in accordance with one embodiment of the present invention.

FIG. 1 is a block diagram illustrating an overview of a system for accessing a hierarchical data structure in accordance with one embodiment of the present invention.

Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

In one embodiment and by way of a non-limiting example, the system can include a client 100, one or more web/application servers 102, and one or more databases 104, connected by one or more networks 106 or other suitable communication means. A network can include but is not limited to: public and/or private networks, wireless networks, optical networks, and satellite based communication links. Other suitable communication means can include but are not limited to: random access memory, file system(s), distributed objects, persistent storage, and inter-processor communication networks. The WebLogic® Server, available from BEA Systems, Inc., is a suitable web/application server in one embodiment. The one or more databases can include but is not limited to: relational databases, object-oriented databases, file systems, or any other kind of persistent storage.

The client 100 preferably includes a web browser capable of processing Java Script and reading HyperText Markup Language (HTML). The server 102 is a conventional Java Server. The databases 104 preferably include one or more hierarchical data structures that are suitable for rendering as tree structures. The server 102 serves pages to the client 100 that render hierarchical data structures.

Figure 2:
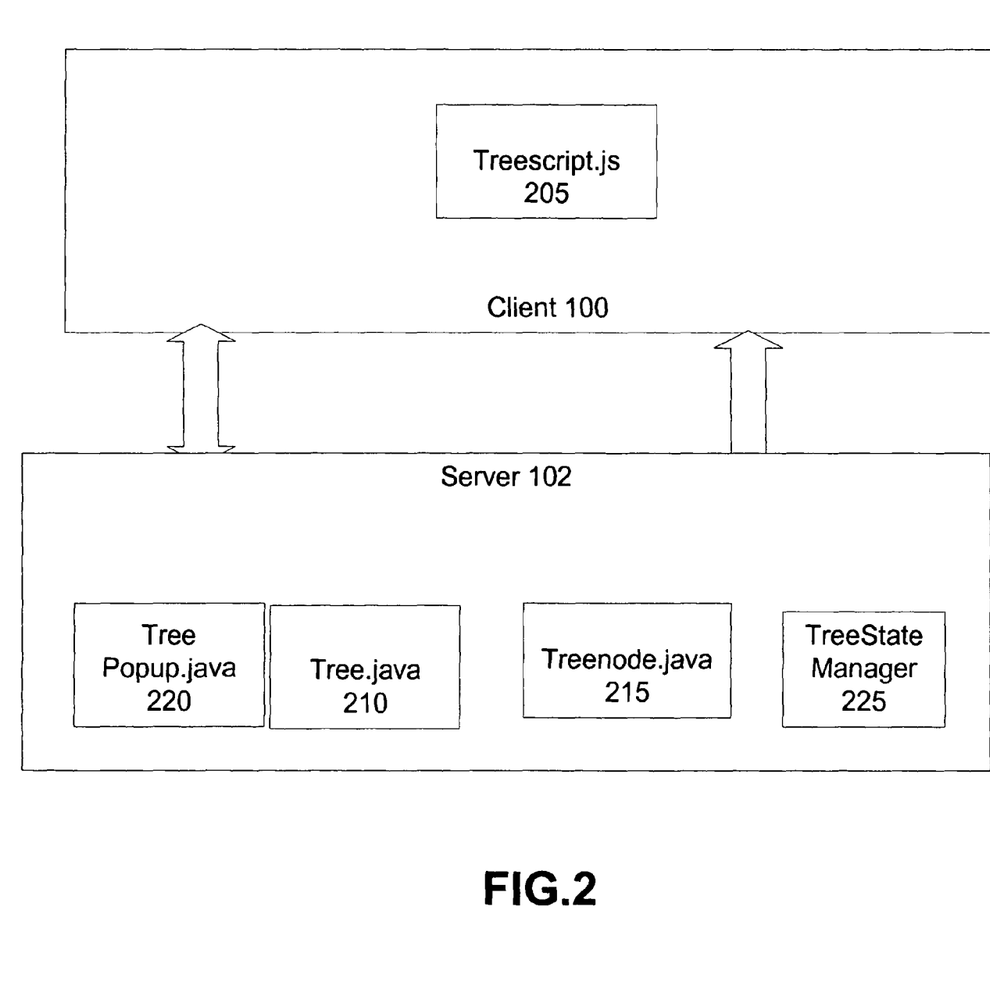
FIG. 2 is a block diagram illustrating a more detailed interaction between a client system, a server system, and their respective elements.

FIG. 2 is a block diagram illustrating a more detailed interaction between the client 100, the server 102, and processes executed thereon. The client 100 runs a treescript.js class 205 that is used to render a tree from information provided by the server 102.

The server 102 maintains a group of classes that are used to generate and operate tree structures and enable their display on the client 100. These classes include Tree.Java classes 210, Tree Popup.Java classes 220, Treenode.java classes 215 and TreeStateManager 225 classes.

The Tree.Java class enables a developer to create a tree on the server 102 which can be viewed through the client 100. A tree can be created through the execution of the following code:

public Tree(java.lang.String name)

The parameters include a "name" parameter, which is the name of the tree.

In the present embodiment, the server 102 performs tree object creation and tree state management, and the tree is rendered by JavaScript on the client. The tree.java module creates a treescript.js module according to the capabilities of the client system and transfers it to the client. In some embodiments, the configuration of the treescript.js file is set according to the type of client used. The treescript.js module can be created dynamically or stored in advance and transferred to the client upon initiation of a session.

The server generates tree state information into Java code that is then consumed by the treescript.js module, which creates a visual representation of the tree on the client. The treescript.js file can contain a conversion program that receives tree information as java objects from the tree.java classes on the server and converts the tree state information into javascript code for rendering the tree on the client browser.

The tree.java class, in managing the tree state on the server, additionally includes the following associated methods. These methods are used to set properties for the tree, including node characteristics. For each method, the parentheses indicate a location where parameters are submitted. For those methods in which parameters are listed with a variable name, the "parameters section" describes the data to be submitted with the parameter.

getHighlightNodePath public java.lang.String getHighlightNodePath( )
 This method returns a highlighted node path for a tree. If this parameter is not set, upon rendering the tree will try to find a highlighted node in the TreeStateManager if it exists, and then use it instead.
 Returns:
 Returns a highlightNodePath.

setHighlightNodePath public void setHighlightNodePath(java.lang.String highlightNodePath)
 This method sets a highlighted node path for a tree. If this parameter is not set, upon rendering the tree will try to find a highlighted node in the TreeStateManager if it exists, and then use it instead.
 Parameters:
 highlightNodePath—The highlightNodePath to set.

getBaseDirectory public java.lang.String getBaseDirectory( )
 Returns:
 Returns a baseDirectory on the server 102 on which a tree image is located. In some embodiments, this defaults to a default directory, e.g, "tree_images/".

setBaseDirectory public void setBaseDirectory(java.lang.String baseDirectory)
 Parameters:
 baseDirectory—Set a base directory where the tree generator will look for images of the tree. Defaults to default directory, e.g. "tree_images/" if not set.

isLocal public boolean isLocal( )
 Returns:
 Returns whether or not the tree is in a local mode or not. A tree in a local mode will not hit the server in case of an expand or a collapse action.

setLocal public void setLocal(boolean isLocal)
 Parameters:
 isLocal—Sets a local mode of the tree. Local mode determines whether the entire tree is generated on the client or, the tree is generated on a need basis only. This value is Boolean, with a positive value indicating that the server is not contacted unless necessary.

getName public java.lang.String getName( )
 Returns:
 Returns the name of the tree. In some embodiments, each tree has a unique name to avoid conflicts.

setName public void setName(java.lang.String name)
 Parameters:
 name—Set the name of the tree.

getRootNode public TreeNode getRootNode( )
 Returns:
 Returns a rootNode of the tree. All trees have a root node.

setRootNode public void setRootNode(TreeNode rootNode)
 Parameters:
 rootNode—This is method sets a root node.

The server 102 also maintains a treenode.java class. The treenode.java class enables the manipulation of individual nodes on the tree. In some embodiments, there is a separate treenode object for each node on a tree. Each node, when created is associated with a URL that is associated with the node and is loaded when the node is accessed. The class can be used to create a tree node through the following command:

public TreeNode(java.lang.String name)
Create a tree node with a given name
The "name" variable indicates a name for the new tree node.

The treenode class additionally includes the following associated methods. These methods are used to set properties for the tree nodes. For each method, the parentheses indicate a location where parameters are submitted. For those methods in which parameters are listed with a variable name, the "parameters section" describes the data to be submitted with the parameter.

addChild public TreeNode addChild(java.lang.String name,java.lang.String action,java.lang.String icon)
Add a child node to the current node.
Parameters:
name—The name of the node.
action—The action associated with the node. This can be a URL or a form name which should be submitted.
icon—The icon which will be used to display the tree node. The same icon will be used to display expanded/collapsed tree.
Returns:
The newly added node.

hasChildren public boolean hasChildren( )
Return whether or not a node has children or not setHasChildren public void setHasChildren(boolean hasChildren)
Set whether or not a node has children or not.
Parameters:
hasChildren—Can be true or false.

getParent public TreeNode getparent( )
Reference to the parent object of the tree node
Returns: The identity of the parent of the node.

isExpanded public boolean isExpanded( )
Returns:
Returns whether or not the node is expanded or not.

setExpanded public void setExpanded(boolean isExpanded)
If true, sets the state of the node to be expanded when displayed in the tree
Parameters:
isExpanded—The expanded state to be set.

getNodePath public java.lang.String getNodePath( )
Return the path associated with the node. This is essentially the path separated by the node delimiter.
Returns:
Returns the nodePath.

setDisplayName public void setDisplayName(java.lang.String displayName)
Sets the displayed name of the TreeNode.
Parameters:
displayName—The displayed name of the tree node.

setSubmitFormName public void setSubmitFormName(java.lang.String submitFormName)
Sets the form to be submitted when this node is clicked. Each node can either have a URL or a form name associated with it.

getSubmitFormName public java.lang.String getSubmitFormName( )
Returns:
Returns the submitFormName.

getUrl public java.lang.String geturl( )
Returns:
Returns a URL associated with the node.

getUrlTargetName public java.lang.String getUrlTargetName( )
Returns:
Returns a target of the URL associated with the node.

setUrl public void setUrl(java.lang.String url,
java.lang.String urlTargetName)
Sets the url associated with the node.
Parameters:
URL—The URL to set.
urlTargetName—If a user wants a URL to open in a separate frame or a window, the name can be specified here. If not specified, when a user clicks on the node, the response to the URL will replace the window's contents.

getName public java.lang.String getName( )
Returns:
Returns the name of the node setName public void setName(java.lang.String name)
Parameters:
name—Set the name of the node getChildren public java.util.List getChildren( )
Return a list of all the children TreeNode objects of this tree node.
Returns:
A list containing children of the tree node.

getPopup public TreePopup getPopup( )
Returns:
Returns the popup associated with the node, which is invoked when the user right clicks on the node.

setPopup public void setPopup(TreePopup popup)
Parameters:
popup—Set the popup associated with the node.

getPopupText public java.lang. String getPopupText( )
   Returns:
   Returns the text which is displayed when the user hovers the mouse over the node image.

setPopupText public void setPopupText(java.lang.String popupText)
   Parameters:
   popupText—Sets the text which is displayed when the user hovers the mouse over the node image.

The treepopup classes 220 control the behavior of popup menus associated with each node in the tree. These classes include methods for enabling and disabling popup menus for each node.

The TreeStateManager 225 class is used to store and maintain a current state of the tree. For each tree, a TreeStateManager instance is generated. The TreeStateManager includes the following associated methods. These methods are used to obtain information about a state of the tree. For each method, the parentheses indicate a location where parameters are submitted. For those methods in which parameters are listed with a variable name, the "parameters section" describes the data to be submitted with the parameter.

getInstance public static TreeStateManager getInstance(javax.servlet.http.HttpSession session, java.lang.String name)

Return an instance of the TreeStateManager for the tree with the given name.

Parameters:

session—The session object.

name—The name of the tree.

Returns:

TreeStateManager instance.

getHighlightedNodePopup public TreePopup getHighlightedNodePopup( )
   Returns:
   Returns the selected popup item of the tree node.

getHighlightedNodeName public java.lang.String getHighlightedNodeName( )
   Returns:
   Returns the highlightedNodeName for a selected node.

setHighlightedNodeName public void setHighlightedNodeName(java.lang. String highlightedNodeName)
   Parameters:
   highlightedNodeName—The highlightedNodeName to set for a node.

setHighlightedNodeData public void setHighlightedNodeData(java.lang.String highlightedNodeData)
   Parameters:
   highlightedNodeData—The highlightedNodeData to set.

getHighlightedNodePath public java.lang.String getHighlightedNodePath( )
   Returns:
   Returns the highlightedNodePath for a node.

setHighlightedNodePath public void setHighlightedNodePath(java.lang.String highlightedNodePath)
   Parameters:
   highlightedNodePath—The highlightedNodePath to set.

processState public void processState(javax.servlet.http.HttpServletRequest request)
   Process the state of the tree after a user has performed either of the following actions in the tree—expanded a node, collapsed a node, zoomed in or out, paged through a window or selected a node.
   Parameters:
   request—The request object which would contain this information.

isNodePathPaginated public boolean isNodePathPaginated(java.lang.String nodePath)
   Return whether or not the given node path is paginated or not.
   Parameters:
   nodePath—The path of the node
   Returns:
   true or false depending whether the node is paginated or not.

addNodePathAsPaginated public void addNodePathAsPaginated(java.lang.String nodePath)
   Force a particular node path to be paginated, if it is not already paginated.
   Parameters:
   nodePath—The path of the node.

removeNodePathAsPaginated public void removeNodePathAsPaginated(java.lang.String nodepath)
   Remove the given node as being paginated.

setExpandNodesFromPath public void setExpandNodesFromPath(java.lang.String nodePath)
   Marks all nodes below the given path to be expanded.
   Parameters:
   nodePath—The path to the tree node.

getExpandNodesFromPath public java.lang.String getExpandNodesFromPath( )

addNodeAsExpanded public void addNodeAsExpanded(java.lang.String nodePath)
   Add a particular node, identified by its path as expanded in the tree.
   Parameters:
   nodePath— isNodeExpanded public boolean isNodeExpanded(java.lang.String nodePath)
   Indicate whether or not the given node, identified by its path is expanded or not
   Parameters:
   nodePath—The node path Returns: A Boolean value indicating whether a node is expanded.

In some embodiments, the system closely mimics the APIs between corresponding java objects and javascript objects so as to allow for easy data transfer between the two mediums. For example, the tree.java object has a similar API to the JSTree object in treescript.js, and the treenode.java object has a similar API to the JSTreeNode object in treescript.js. This interoperability allows for easy conversion to current embodiments from previous designs.

Figure 3:
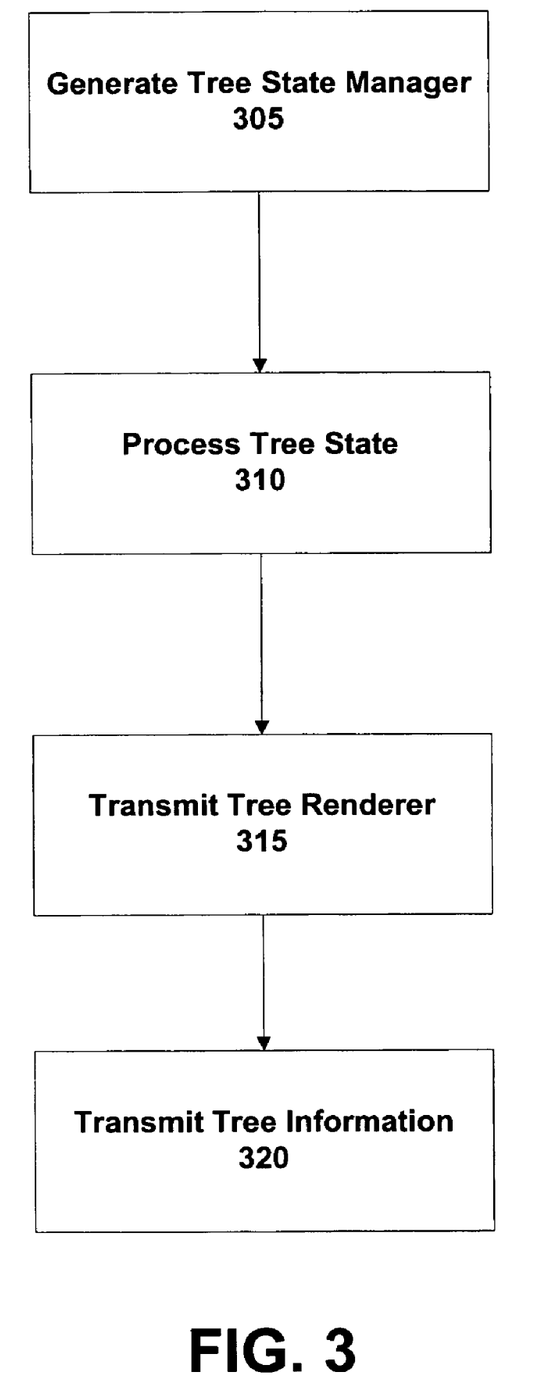
FIG. 3 is a flow chart illustrating one embodiment of a method for processing a hierarchical data structure.

FIG. 3 is a flow chart illustrating one embodiment of a process for loading a tree representing a hierarchical data structure. In step 305, the server generates a tree state manager for a tree. This step is preferably performed when a user of the client 100 access a page listing a tree or selects a tree related link. A tree state manager object for a tree titled "local tree" can be created through the execution of the following code TreeStatemanager treestatemanager=TreeStatemanager.getinstance(session, "localTree").

In step 310, the treestatemanager object determines a state of a tree. The state of the tree can include a current node arrangement of the tree as well. In the present embodiment, the tree state can be processed in response to a user selecting a node on a tree, but in alternate embodiments the step can be performed automatically or in response to another action. Step 310 can be implemented when the following code is executed:

Treestatemanager.processState(request).

The server can also return information for a particular node on a tree. This information can include the URL associated with the node as well as supplementary information associated with the node.

In step 315, the server transmits a renderer such as the treescript.js module. The treescript.js module receives information from the server, which is used to generate javascript code for rendering the tree on the client.

In step 320, the server transmits tree information to the client. This information can be transmitted in a variety of formats. In some embodiments, the tree information can be transmitted as a text file. In alternate embodiments, formats such as extensible Markup Language documents or other formats can be used. This information is used by the treescript.js module on the client to generate javascript code for presenting the tree to a user.

Figure 4:
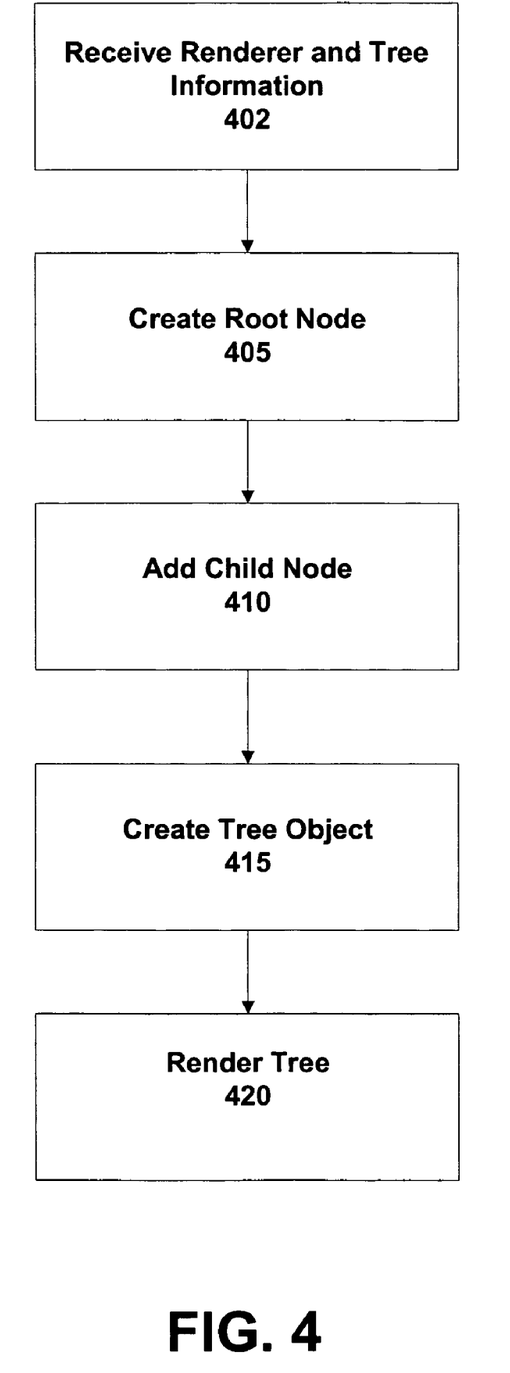
FIG. 4 is a flow chart illustrating one embodiment of a process for rendering a hierarchical data structure.

FIG. 4 is a flow chart illustrating one embodiment of a process for rendering a hierarchical data structure. This process can be performed in JavaScript generated by the treescript.js module in the client. In step 402 a rendering module is received from the server. In some embodiments, this rendering module is the treescript.js module. During this step tree state information can also be received by the treescript.js for rendering the tree.

In step 405, a root node is created for the new tree. The root node is the core element of the tree and all child nodes are associated with it. The instructions for creating a root node titled "local tree root" can be represented as:

TreeNode root=new TreeNode ("Local Tree Root"). These instructions can be generated by the treescript.js module when it receives tree state information from the server.

In step 410 a child node is added to the root node. The child is associated with a root node and includes a name "firstChild", an action that is performed when the node is selected (form submission) and an icon (folder.gif) to represent the node in a graphical interface. This action can be implemented by the following code, which is also generated by the treescript.js module when it receives tree state information from the server:

addChild("firstChild", submitform, folder.gif)

In step 415 a tree object is created that references the root node created in step 405. The tree object can be implemented through the following code:

Tree localTree=new Tree ("localTree", root, true").

In step 420, the tree is rendered and presented to a user when the javascript is executed by client web browser.

Figure 5:
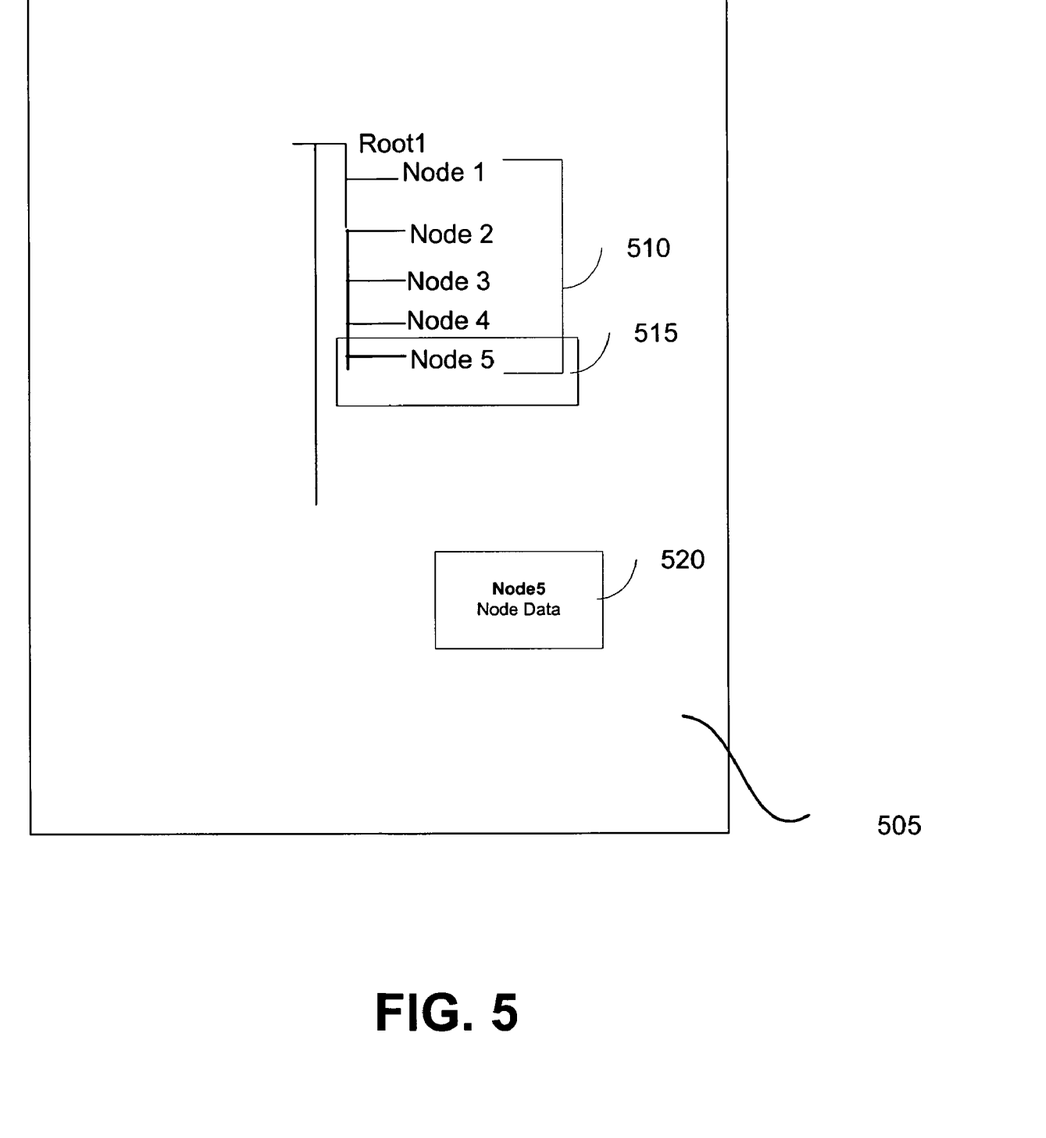
FIG. 5 is one embodiment of an interface for interacting with a hierarchical data structure.

FIG. 5 is one embodiment of an interface for interacting with a hierarchical data structure. A browser window includes a tree structure 510 that represents a hierarchical data structure such as a file system. A root node supports a group of child nodes that are associated with the root node. In some embodiments, some of the child nodes include their own child nodes. In the present embodiment, one of the nodes is highlighted 515. In some embodiments, items on the tree can be selected by moving a mouse arrow or other selector over the node of the tree. A JavaScript interface, maintained by the treescript.js module generates the interface. A node information window 520 displays node data which can include a URL associated with the node, or user-configured data.

The tree nodes can be expanded to display subnodes by selecting the nodes with a pointer or other interface tool. Additionally, the trees, when expanded can display paginated hierarchies. Thus, if a node, once expanded, displays more elements that can be displayed on a single page, the tree can optionally load only those nodes that would be displayed on the first page, rather than all of the nodes, and load the new nodes as necessary.

It should be noted that while the embodiments used herein use Java and Javascript, in alternate embodiments other languages can be used to produce the tree data on the server. Additionally, other scripting languages can be used to render the tree on the client. Java and Javascript are merely used for illustrative purposes in the present application.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for representing a hierarchical data structure at a server, as a tree on a client, comprising the steps of:
   receiving, from a client having a processor and a browser application executing thereon, requests to access or display a hierarchical data structure at a server within a session;
   providing, to the client, a rendering module for use by the client,
      wherein the rendering module is configured for each different type of client according to the different type or capabilities of the client, and
      wherein the rendering module receives, during the session, information from the server defining a current state of a tree representing the hierarchical data structure at the server, including one or more nodes therein;
   generating an instance of a tree state manager, which manages the state of a tree for the client during the session;
   determining, using the tree state manager at the server, in response to receiving the requests from the client, the current state of the tree representing the hierarchical data structure, and generating information defining the current state of the tree;
   transmitting the information defining the current state of the tree, in an object format, from the server to the client;
   receiving, at the client, the information defining the current state of the tree;
   using the rendering module at the client to convert the information from the object format to a script format representing the hierarchical data structure at the server and including the current state of the tree, according to the capabilities of the client;
   executing the script, as converted, in the client's browser application, to display the current state of the tree;
   subsequently receiving from the client, further requests to access or display additional nodes, or to expand, collapse or zoom nodes in the hierarchical data structure at the server; and
   determining, using the tree state manager at the server, in response to receiving the further requests from the client, a new state of the tree representing the hierarchical data structures, generating further information defining the new state of the tree, and transmitting the further information to the client, for use by the client during the session in displaying an updated representation of the hierarchical data structure in the client's browser application.

2. The method of claim 1, wherein the tree comprises child nodes and each child node is identified by a path in a file system.

3. The method of claim 1, further comprising:
   creating a rendering module according to the capabilities of the client system and transferring it to the client, including setting the configuration of the rendering module according to the type of client used.

4. The method of claim 1, wherein the information received at the client is in the form of a plurality of software objects which are generic to all client types or capabilities, and wherein the rendering module at each client, which is configured for each different type of client according to the different type or capabilities of the client, converts the software objects from their generic format to script that can be executed in the client's browser application.

5. The method of claim 4, wherein the plurality of software objects are XML files.

6. The method of claim 1, wherein each rendering module is provided to the client at the start of a session between the client and the server, and is one of created dynamically, or stored at the server in advance, and then transferred to the client upon initiation of the session.

7. A machine readable storage medium having instructions stored thereon that when executed by a processor cause a system to:
   receive, from a client having a processor and a browser application executing thereon, requests to access or display a hierarchical data structure at a server within a session;
   provide, to the client, a rendering module for use by the client,
      wherein the rendering module is configured for each different type of client according to the different type or capabilities of the client, and
      wherein the rendering module receives, during the session, information from the server defining a current state of a tree representing the hierarchical data structure at the server, including one or more nodes therein;
   generate an instance of a tree state manager, which manages the state of a tree for the client during the session;
   determine, using the tree state manager at the server, in response to receiving the requests from the client, the current state of the tree representing the hierarchical data structure, and generating information defining the current state of the tree;
   transmit the information defining the current state of the tree, in an object format, from the server to the client;
   receive, at the client, the information defining the current state of the tree;
   use the rendering module at the client to convert the information from the object format to a script format representing the hierarchical data structure at the server and including the current state of the tree, according to the capabilities of the client;
   execute the script, as converted, in the client's browser application, to display the current state of the tree;
   subsequently receive from the client, further requests to access or display additional nodes, or to expand, collapse or zoom nodes in the hierarchical data structure at the server; and determine, using the tree state manager at the server, in response to receiving the further requests from the client, a new state of the tree representing the hierarchical data structures, generating further information defining the new state of the tree, and transmitting the further information to the client, for use by the client during the session in displaying an updated representation of the hierarchical data structure in the client's browser application.

8. The machine readable storage medium of claim 7, wherein the tree comprises child nodes and each child node is identified by a path in a file system.

9. The machine readable storage medium of claim 7, further comprising instructions for creating a rendering module according to the capabilities of the client system and transferring it to the client, including setting the configuration of the rendering module according to the type of client used.

10. The machine readable storage medium of claim 7, wherein the information received at the client is in the form of a plurality of software objects, and wherein the rendering module at each client converts the software objects to script.

11. The machine readable storage medium of claim 10, wherein the plurality of software objects are XML files.

12. The machine readable storage medium of claim 7, wherein each rendering module is provided to the client at the start of a session between the client and the server, and can be either created dynamically, or stored at the server in advance, and then transferred to the client upon initiation of the session.

13. A system for representing a hierarchical data structure at a server as a tree on a client comprising:

a client having a processor and a browser application executing thereon, for sending requests to access or display a hierarchical data structure at a server;

a server for providing to the client a rendering module for use by the client during a session, wherein the rendering module is configured for each different type of client according to the different type of capabilities of the client, and wherein the rendering module receives, during the session, information from the server defining a current state of a tree representing the hierarchical data structure at the server, including one or more nodes therein;

wherein the client and server are configured to generate an instance of a tree state manager, which manages the state of a tree for the client during the session;

determine, using the tree state manager at the server, in response to receiving the requests from the client, the current state of the tree representing the hierarchical data structure, and generating information defining the current state of the tree;

transmit the information defining the current state of the tree, in an object format, from the server to the client;

receive, at the client, the information defining the current state of the tree;

use the rendering module at the client to convert the information from the object format to a script format representing the hierarchical data structure at the server and including the current state of the tree, according to the capabilities of the client;

execute the script, as converted, in the client's browser application, to display the current state of the tree;

subsequently receive from the client, further requests to access or display additional nodes, or to expand, collapse or zoom nodes in the hierarchical data structure at the server; and determine, using the tree state manager at the server, in response to receiving the further requests from the client, a new state of the tree representing the hierarchical data structures, generating further information defining the new state of the tree, and transmitting the further information to the client, for use by the client during the session in displaying an updated representation of the hierarchical data structure in the client's browser application.

14. The system of claim 13, further comprising:

creating a rendering module according to the capabilities of the client system and transferring it to the client, including setting the configuration of the rendering module according to the type of client used.

15. The system of claim 13, wherein the information received at the client is in the form of a plurality of software objects which are generic to all client types or capabilities, and wherein the rendering module at each client, which is configured for each different type of client according to the different type or capabilities of the client, converts the software objects from their generic format to script that can be executed in the client's browser application.

16. The system of claim 15, wherein the plurality of software objects are XML files.

17. The system of claim 13, wherein each rendering module is provided to the client at the start of a session between the client and the server, and can be either created dynamically, or stored at the server in advance, and then transferred to the client upon initiation of the session.

* * * * *

UNITED STATES PATENT AND TRADEMARK OFFICE
CERTIFICATE OF CORRECTION

PATENT NO. : 7,783,670 B2  
APPLICATION NO. : 11/340392  
DATED : August 24, 2010  
INVENTOR(S) : Patadia Page 1 of 2

It is certified that error appears in the above-identified patent and that said Letters Patent is hereby corrected as shown below:

Please delete drawing sheet 2 of 5 and insert drawing sheet 2 of 5 as attached.

In column 5, line 43, delete "getparent( )" and insert -- getParent( ) --, therefor.

In column 5, line 62, delete "delimeter." and insert -- delimiter. --, therefor.

In column 6, line 19, delete "geturl( )" and insert -- getUrl( ) --, therefor.

In column 7, line 51, delete "java.lang. String" and insert -- java.lang.String --, therefor.

In column 8, line 20-21, delete "nodepath)" and insert -- nodePath) --, therefor.

In column 8, line 41, delete "nodepath)" and insert -- nodePath) --, therefor.

In column 9, line 43, delete "extensible" and insert -- eXtensible --, therefor.

In column 13, line 40, in claim 13, delete "of" and insert -- or --, therefor.

Signed and Sealed this  
Twenty-first Day of June, 2011

David J. Kappos  
*Director of the United States Patent and Trademark Office*